United States Patent [19]
Goddard

[11] Patent Number: 5,940,578
[45] Date of Patent: Aug. 17, 1999

[54] WATER EVAPORATION APPARATUS

[75] Inventor: Earl Fenton Goddard, Mt Hawthorn, Australia

[73] Assignee: Yen Enterprises Pty Ltd., East Victoria Park, Australia

[21] Appl. No.: 09/120,455

[22] Filed: Jul. 23, 1998

Related U.S. Application Data

[63] Continuation of application No. PCT/AU98/00427, Jun. 5, 1998.

[30] Foreign Application Priority Data

Jun. 17, 1997 [AU] Australia ................................. PO7415
Dec. 22, 1997 [AU] Australia ................................. PP1096

[51] Int. Cl.$^6$ .............................. A61H 33/12; F22B 1/30
[52] U.S. Cl. ........................................... 392/406; 392/337
[58] Field of Search ................................. 392/324, 328, 392/333, 336, 337, 386, 394, 402, 403, 404, 406; 203/10, 100; 159/16.2

[56] References Cited

U.S. PATENT DOCUMENTS

| | | | |
|---|---|---|---|
| 2,468,244 | 4/1949 | Steen | 392/328 |
| 2,840,682 | 6/1958 | Rubenstein et al. | 392/337 |
| 2,875,314 | 2/1959 | Schreyer | 392/406 |
| 3,301,998 | 1/1967 | Trickey | 392/403 |
| 3,584,192 | 6/1971 | Mang . | |
| 3,679,867 | 7/1972 | Canter . | |
| 3,809,374 | 5/1974 | Schossow | 392/402 |
| 3,825,491 | 7/1974 | Sanchez . | |
| 4,399,349 | 8/1983 | Deming et al. | 392/403 |
| 4,687,550 | 8/1987 | Wong . | |
| 4,834,836 | 5/1989 | Wemhoff | 159/23 |
| 5,032,218 | 7/1991 | Dobson | 156/642 |
| 5,059,287 | 10/1991 | Harkey, Sr. . | |
| 5,060,560 | 10/1991 | VanDeMark | 392/401 |
| 5,248,395 | 9/1993 | Rastelli et al. | 203/41 |
| 5,361,322 | 11/1994 | Glucksman . | |
| 5,573,661 | 11/1996 | Rachak . | |
| 5,582,680 | 12/1996 | Vankouowenberg et al. . | |
| 5,788,930 | 8/1998 | McMurray | 422/121 |

*Primary Examiner*—Teresa Walberg
*Assistant Examiner*—Sam Paik
*Attorney, Agent, or Firm*—Larson & Taylor

[57] ABSTRACT

A water evaporation apparatus 10 for evaporating water 12 contained in a drum 14 includes a thermally insulated float assembly 16 for floating in the water 12. The float assembly defines a space 18 which is in fluid communication with the water 12 via a hole 22 formed though a bottom wall 24 of the float assembly 16. The float assembly 16 also includes an exhaust stack 26 which extends from the space 18 and has a discharge end 28 located outside the drum 14. A volume of water 20 flows into space 18 through the hole 22. A heater 30 is located within the space 18 and below the level of the water 20 for causing evaporation thereof. This generates steam and other vapours which rise through the stack 26 and are vented through discharge end 28. As the water 20 is evaporated it is replenished by water 12 from the drum 14 flowing through the hole 22 into the space 18. In this way, the water 12 within the drum 14 is progressively evaporated. When the water level within the drum 14 drops to a lowest level L a switch 68 is operated by a stop 70 mounted on the stack 26 to cover power to the heater 30.

20 Claims, 4 Drawing Sheets

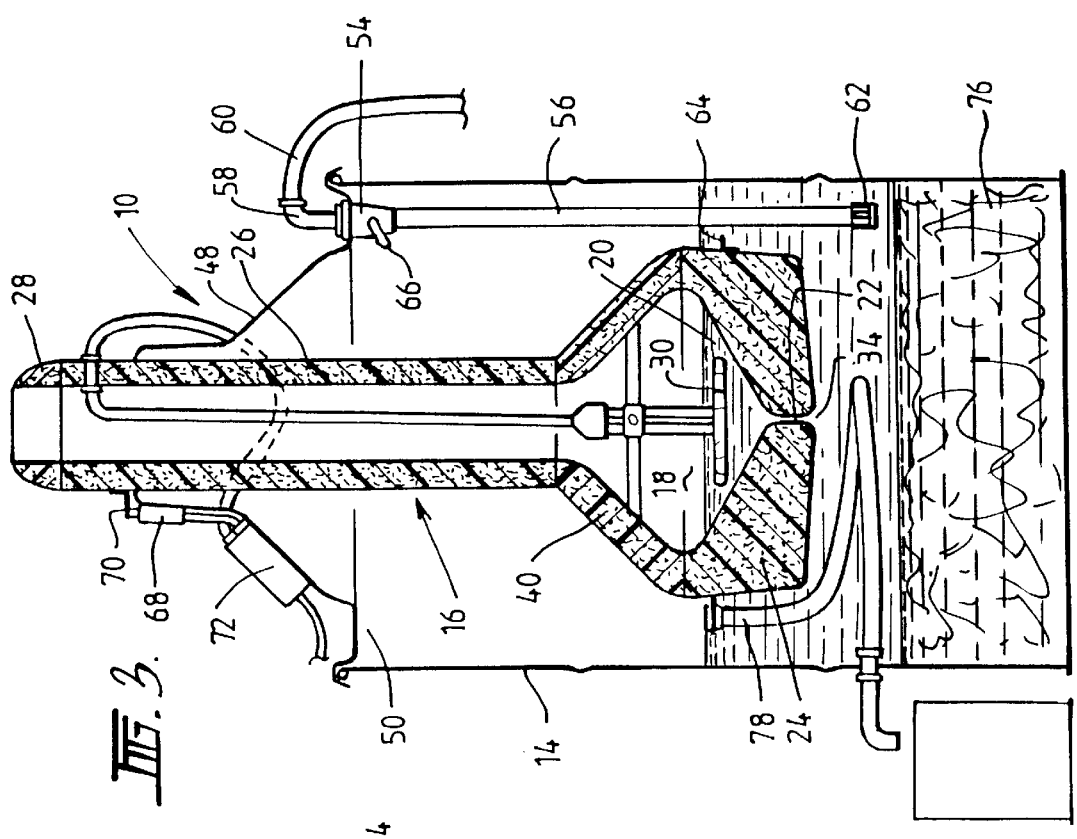
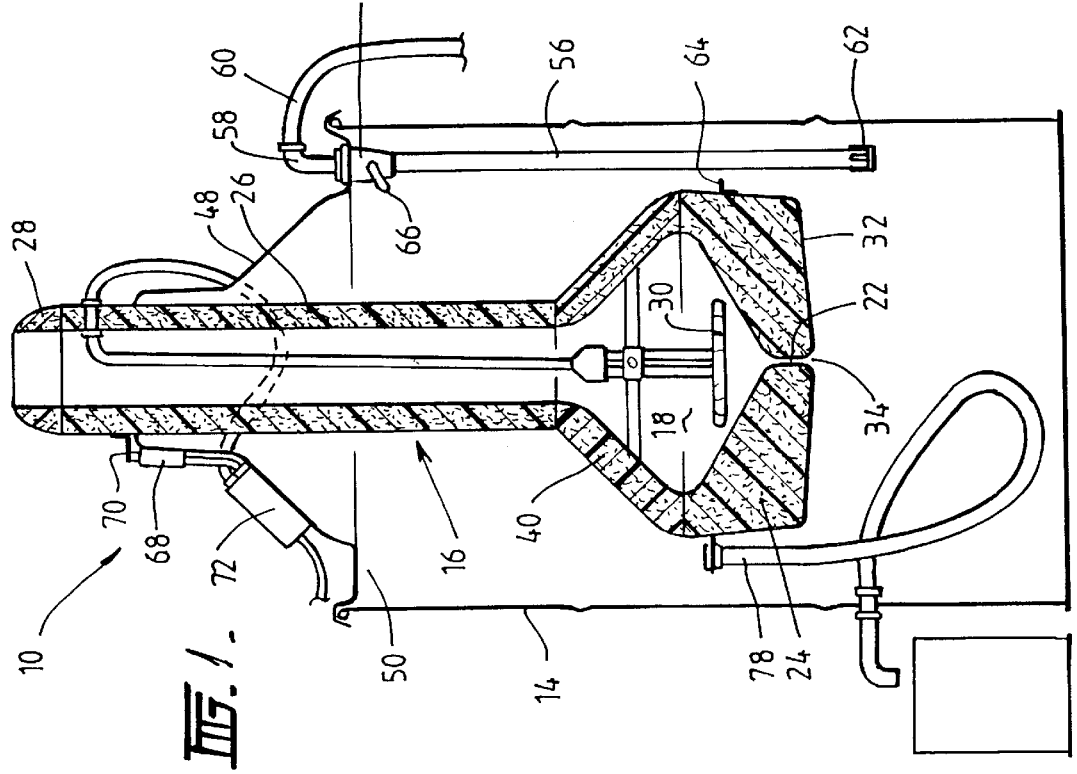

WATER EVAPORATION APPARATUS

This is a continuation application of International PCT Application No. PCT/AU98/00427, filed on Jun. 5, 1998, designating the United States of America, which is now pending.

FIELD OF THE INVENTION

The present invention relates to a water evaporation apparatus particularly, though not exclusively, for treating waste water.

BACKGROUND OF THE INVENTION

Many different types of water evaporation apparatuses, systems and methods are already known for diverse purposes such as treating waste water or in humidifiers. One example is the forced air evaporator which utilise blowers to force air in a counter current to a spray of water pumped to the top of a column and free falling downward. This type of evaporator is cost effective and highly efficient when the waste water to be evaporated is preheated by another process, and where the waste water does not contain volatile compounds that would be readily transferred to the air and thereby create or air pollution. However this type of evaporator is not recommended for water having high dissolved or suspended solids content as the solids deposit on the internals of the evaporator and block the water flow.

Another type of evaporator is the boiler. This is a relatively simple apparatus in which water is heated to its boiling point typically by the burning of a fossil fuel in a chamber immediately below a tank holding the water. As the water boils steam is generated which is exhausted via an exhaust pipe. This type of evaporator is relatively inefficient in terms of energy use as the heat generated goes not only into boiling of the water but also into the heating of the apparatus itself and the surrounding area. Further if the waste water contains dissolved or suspended solids, the efficiency rapidly decreases as the solids settle on the bottom of the tank forming an insulating layer between the source of heat and the water. Also, unless the boiler is properly maintained, the solids bake onto the bottom of the tank and are difficult to remove and also promote corrosion of the tank leading to early tank failure.

Another type of evaporator used for evaporating water in a drum or vessel comprises a band type electric heating element which is wrapped around the outside of the drum. This type of evaporator is also energy inefficient as it not only heats the water itself to cause evaporation but also the drum and the surrounding area. Further it creates a safety hazard for any person accidentally touching the outside of the drum.

SUMMARY OF THE INVENTION

It is an object of the present invention to provide a water evaporation apparatus that attempts to alleviate the above described deficiencies in the prior art.

According to the present invention there is provided a water evaporation apparatus for evaporating water contained in a receptacle including:

a thermally insulated float assembly for floating in water contained within the receptacle, the float assembly defining a space and having a hole extending from the space to a bottom wall of the float to provide fluid communication between the receptacle and the space so that a volume of that water can flow into the space, the space formed with a lower surface which slopes downwardly to the hole for directing sediment or precipitate that settles from the volume of water to flow down the lower surface and through the hole to sink to the bottom of the receptacle, the float assembly also having an exhaust stack which extends from the space to a location outside the receptacle; and a heater supported by the float assembly for heating the volume of water held within the space to cause evaporation thereof so that as the volume of water in the space is evaporated, the evaporated water is vented through the exhaust stack to a location outside of the receptacle and replaced by water from the receptacle which flows into the space thereby progressively evaporating the water from the receptacle.

Preferably the hole is of a diameter that limits the flow rate of water into the space so as to not prohibit the counter flow of sediment or precipitate from the space through the hole into the receptacle.

Preferably the lower surface is in the shape of a cone with an internal apex angle in the order of 100–140°. Most probably, the internal apex angle of the bottom surface is about 120°.

Preferably the hole is of a diameter in the range of 5–10 millimeters. Most preferably the hole is of a diameter of about 7.5 millimeters.

Preferably a bottom surface of the bottom wall tapers downwardly in the radial direction from the outer periphery of the bottom wall to a central point coincident with the lower opening of the hole.

Preferably the water evaporation system includes a lid that is dimensioned to cover an open end of the receptacle and is provided with an aperture through which the exhaust stack passes and can slide, so that as water is evaporated from or added to the receptacle the exhaust stack slides down or up, respectively through the lid commensurate with the change in level of the water.

Preferably the water evaporation system further includes a switch for controlling the delivery of power to the heater, the switch automatically operated to cut off power to the heater when the water level drops to a first predetermined level.

Preferably the switch is mounted on the lid and is tripped by a stop formed on or coupled to the exhaust stack.

Preferably the location of the stop along the exhaust stack can be adjusted to thereby provide adjustment of the first predetermined level.

Preferably the stack and the float are formed as separate components that are detachable coupled so that they can be separated for servicing of the heater and space.

Preferably the float assembly or exhaust stack is provided with a second stop for activating a valve that controls the in flow of water into the receptacle, the second stop operating the valve when the float assembly is at a second level above the first level, thereby prohibiting further in flow of water into the receptacle.

Preferably the water evaporation apparatus further includes an ozone generating device for generating ozone and delivering that ozone to the space above the volume of water for purifying air and evaporated water discharged from the exhaust stack.

Optionally, the water evaporation apparatus may also be provided with an exhaust fan mounted along the exhaust stack to draw evaporated water and air from the exhaust stack. Additionally, the float assembly or exhaust stack may be provided with one or more breath holes at a level above the surface level of the water in the receptacle to allow air to be drawn into the float assembly. Alternately the apparatus may be provided with a fan which blows air into the space at a level near and above the surface of the volume of water to assist in blowing the steam and water vapour up and out of the stack In yet a further variation the ozone generator may be provided with an integrated fan for blowing ozone into the space and blowing steam and water vapour up and out of the stack.

In a further optional feature the water evaporation apparatus may also be provided with a surface skimming device for skimming oils or other floating materials from the surface of the water.

According to another aspect of the present invention there is provided a water evaporation apparatus for evaporating water contained in a receptacle including:

a thermally insulated float assembly for floating in water contained within the receptacle, the float assembly defining a space in fluid communication with the water in the receptacle so that a volume of that water can flow into the space, the float assembly also having an exhaust stack which extends from the space to a location outside the receptacle;

a heater supported by the float assembly for heating the volume of water held within the space to cause evaporation thereof so that as the volume of water in the space is evaporated, the evaporated water is vented through the exhaust stack to a location outside the receptacle and replaced by water from the receptacle that flows into the space thereby progressively evaporating the water from the receptacle;

a lid that is dimensioned to cover an open end of the receptacle and provided with an aperture through which the exhaust stack passes and can slide, so that as water is evaporated from or added to the receptacle, the exhaust stack slides up or down through the aperture; a switch mounted on the lid for controlling the delivery of power to the heater, and, a stop formed on or coupled to the exhaust stack for automatically operating the switch to cut off a power supply to the heater when the water level drops to a first predetermined level.

According to another aspect of the present invention there is provided a water evaporation apparatus for evaporating water contained within a receptacle including:

a thermally insulated float assembly for floating in water contained within the receptacle, the float assembly defining a space in fluid communication with the water in the receptacle so that a volume of that water can flow into the space, the float assembly also having an exhaust stack that extends from the space to a location outside the receptacle;

a heater supported by the float assembly for heating the volume of water held within the space to cause evaporation thereof so that as the volume of water in the space is evaporated, the evaporated water is vented through the exhaust stack to a location outside the receptacle and replaced by water from the receptacle which flows into the space thereby progressively evaporating water from the receptacle; and a stop provided on the float assembly or exhaust stack for activating a valve the flow of water into the receptacle, the stop operating the valve when the float assembly is at a predetermined upper level, thereby prohibiting further flow of water into the receptacle.

BRIEF DESCRIPTION OF THE DRAWINGS

An embodiment of the present invention will now be described by way of example only with reference to the accompanying drawings in which:

FIG. 1 is a sectional view of a first embodiment of the water evaporation apparatus in an empty receptacle;

FIG. 3 is a representation of water evaporation apparatus in FIG. 1 at its lowest operating level within the receptacle;

DETAILED DESCRIPTION OF PREFERRED EMBODIMENTS

Figure 2:
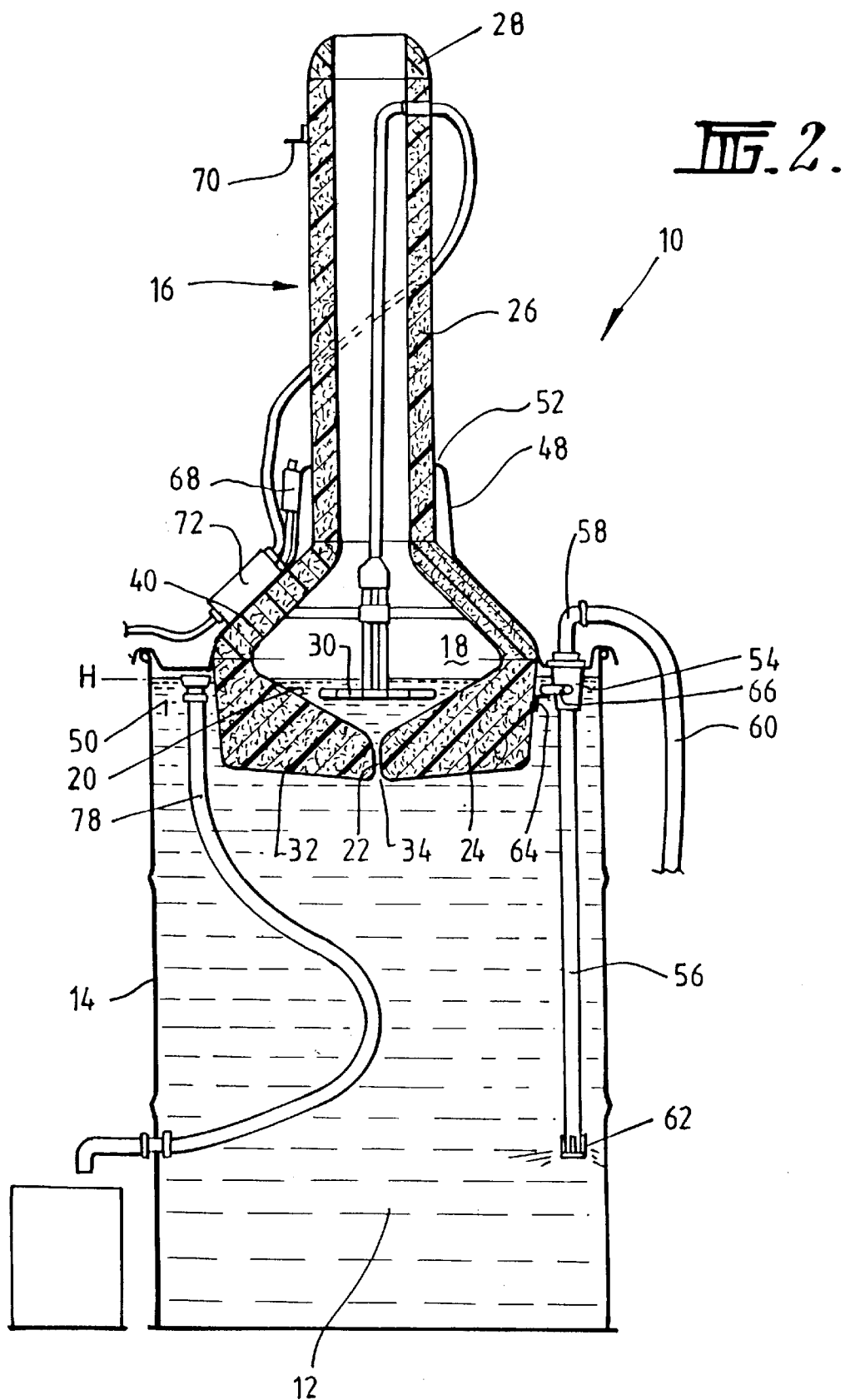
FIG. 2 represents the water evaporation apparatus for FIG. 1 in which the receptacle is full.

Referring to the accompanying drawings and in particular FIGS. 1–3, the water evaporation apparatus 10 for evaporating water 12 contained in a receptacle such as drum 14 includes a thermally insulated float assembly 16 for floating in the water 12, the float assembly defining a space 18 in fluid communication with the water 12 in the drum 14 so that a volume of water 20 can flow into the space 18. The fluid communication between the space 18 and drum 14 is provided via a hole 22 formed through a bottom wall 24 of the float assembly 16. The float assembly 16 also includes an exhaust stack 26 which extends from the space 18 and has a discharge end 28 located outside of the drum 14. A heater 30 is located within the space 18 for applying heat to the volume of water 20 to cause evaporation thereof. The evaporating water is in the form of steam which rises through the stack 26 and is discharged through the discharge end 28. As the water 20 is evaporated it is replenished by water 12 from the drum 14 flowing through hole 22 into the space 18. In this way, the water 12 within the drum 14 is progressively evaporated The buoyancy of the float assembly 16 (inclusive of the stack 26) and juxtaposition of the heater 30 are arranged to ensure that the heater is always covered by water, and preferably to between a minimum depth of 4 mm and a maximum depth of 10 mm. Experimentation has indicated that the maximum difference in specific gravity between pure water and the "dirtiest" water one would reasonably expect to encounter is about 6 millimeters. Therefore the level of the beater 30 and buoyancy of the float assembly 16/stack 26 are typically arranged so that in pure water the float is covered to a depth of 10 millimeters.

Figure 4:
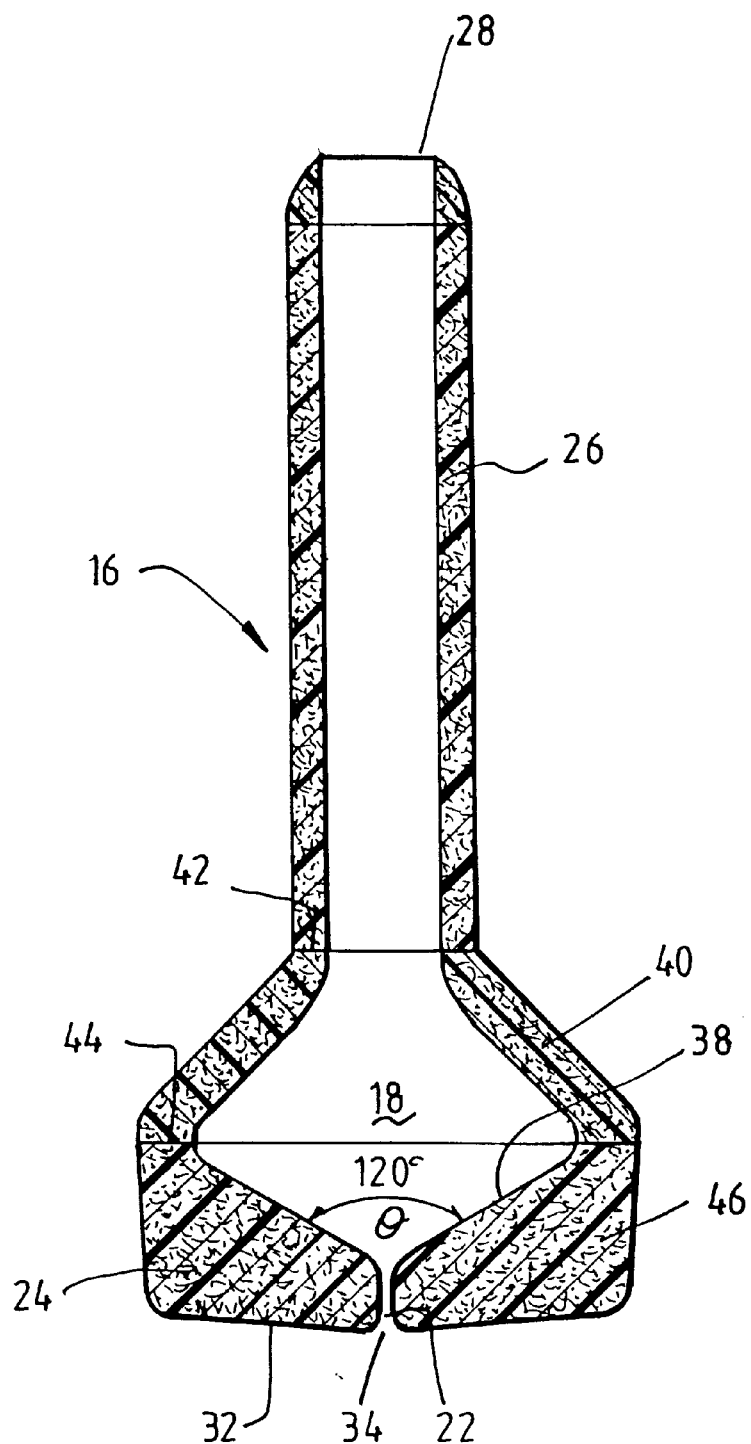
FIG. 4 is a sectional view of a float assembly incorporated in the water evaporation apparatus shown in FIGS. 1–3; and, FIG. 5 is a sectional view of a second embodiment of the water evaporation apparatus.

Referring to FIG. 4, the bottom surface 32 of the bottom wall 24 is conically shaped so as to taper in a downward direction from its radially outermost peripheral edge to the centre of the bottom surface 32. The hole 22 also passes through the centre of the bottom wall so that lower opening 34 of the hole 22 is at the apex of the bottom surface 32. When the float assembly 16 is placed in the water 12, the lower opening 34 of hole 22 is below the water level. As a result, the water 12 entering the space 18 is also derived from below the surface level so as to reduce the likelihood of oils or other floating (as distinct from suspended) particles or substances entering the space 18.

Lower surface 38 of the space 18 slopes downwardly in a conical manner and together with the hole 22 form a funnel shaped structure. As a result, suspended particles settling from the volume of water can roll, slide or otherwise move down the lower surface 38 through the hole 22 and back into the main volume of water 20 for final settling at the bottom of the drum 14. This settling process may be optimised by forming the surface 38 with a particular degree of slope and the hole 22 with a particular range of diameters. It has been found that if the inside angle θ (refer FIG. 4) about the apex of surface 38 is between 100–140° and the diameter of the hole 22 is between 5–10 millimeters, the rate of flow of water into the space 18 through the hole 22 does not adversely inhibit the counter flow of the settled suspended solids from the space 18 back into the drum 14. Testing is shown a particularly expedient combination is to have the inside angle θ of surface 38 at about 120° and the diameter of the hole 22 about 7.5 millimeter.

The float assembly 16 is formed with an upper frusto-conical shell portion 40 which tapers inwardly in the upward on and joins with the stack 26. Split lines 42 and 44 are formed at the top and bottom of the shell 40 to allow disassembly of the float assembly 16 and stack 26 for the purposes of access to the space 18 and maintenance of the components housed therein including the heater 30. The stack 26 shell 40 and base portion 46 of the float assembly 16 can be demountably coupled by an convenient mechanical arrangement including for example bayonet mounts, screw mounts, or threaded fasteners.

The water evaporation apparatus 10 also includes a lid 48 which is dimensioned to cover the otherwise open upper end 50 of the drum 14. The lid 48 is formed with a central aperture 52 through which the stack 26 can pass and slide. Further, the lid 48 is profiled in a manner complimentary to the exterior shape of the float assembly and in particular the shell 40 so as to accommodate the float assembly 16 when the level of the water 12 within the drum 14 is at its highest level H as shown in FIG. 2. This increases the maximum travel of the float assembly 16 within the drum 14 thereby maximising the volume of water that can be evaporated from the drum 14. The lid 58 also includes an inlet valve 54 disposed within an inlet pipe 56 supported by the lid 48. Upstream end 58 of the pipe 56 extends above the lid 48 and provides a connection point for a hose 60 which delivers the waste water to be evaporated. Downstream end 62 of the inlet pipe 56 is arrange to discharge water laterally rather than downwardly. The valve 54 is normally in an open position so that waste water can flow from hose 60 through the valve 54 and pipe 56 into drum 14. However, a stop 64 is formed on the outside of the float assembly 16 for operating a control lever 66 of the valve 54 when the water level in the drum reaches the maximum high level H. When this occurs the stop activates the lever 66 to shut the valve 54 preventing overflow of the drum 14.

The apparatus 10 is also provided with a switch 68 mounted on the outside of the lid 48 for controlling the delivery of power to the heater 30. The switch 68 automatically cuts off power to the heater 30 when the water level drops to a predetermined lower level L (see FIG. 3). The switch 48 is operated by a stop 70 mounted on the stack 26. When the water level in the drum 14 reaches the lower level L the stop 70 pushes on the switch 68 to cut off power to the heater 30. In this regard the switch 68 provides an input to a control box 72 which controls the overall operation of the apparatus 10. Cable 74 which extends between the control box 72 and the heater 30 contains wires for providing power as well as control to the heater 30.

The stop 70 is mounted on the stack 26 in a manner so that its position can be varied to thereby vary the lowest level L of water within the drum 14 at which power to the heater 30 will be cut off. It is preferred that the lower level L not be too close to the bottom of the drum 14 so as to allow a reasonable volume of sludge 76 to build up at the bottom of the drum 14. In this way, the apparatus 10 can be operated for an extended period of time, eg several months or years before the sludge 76 needs to be removed from the drum 14 to prevent interference with the operation of the apparatus 10. In the worst case scenario, if the sludge is allowed to build up to such an extent that it blocks the hole 22 preventing water from entering the space 18 a conventional automatic overheat cutout circuit (not shown) will cut off power to the heater 30 and activate at least a visual if not also an audio alarm indicating this fact. This will then alert an operator to check the apparatus 10 and prompt the removal of the sludge 76.

The apparatus 10 may be optionally provided with an oil skimming device 78 attached to the outside of the base 46 of the float assembly 16 for skimming off oil and other floating liquids or particles. As the water enters the space 18 front a level below the surface level of the water, these oils and particles would not ordinarily interfere with the operation of the apparatus 10. Nevertheless, provision of the oil skimming device 78 allows for recovery of matter which may be disposed of separately or recycled.

Optionally the apparatus 10 may be provided with an exhaust fan (not shown) mounted across the discharge end 28 for assisting and extracting steam and vapour. The operation of the fan can be linked with that of the heater 30 so as to only operate when the heater 30 is operating With this optional feature, one or more holes may be provided in the floating assembly 16 and/or stack 26 above the water level to allow additional air to enter the space 18 and stack 26. It is believed that this may assist in the evaporation process.

Figure 5:
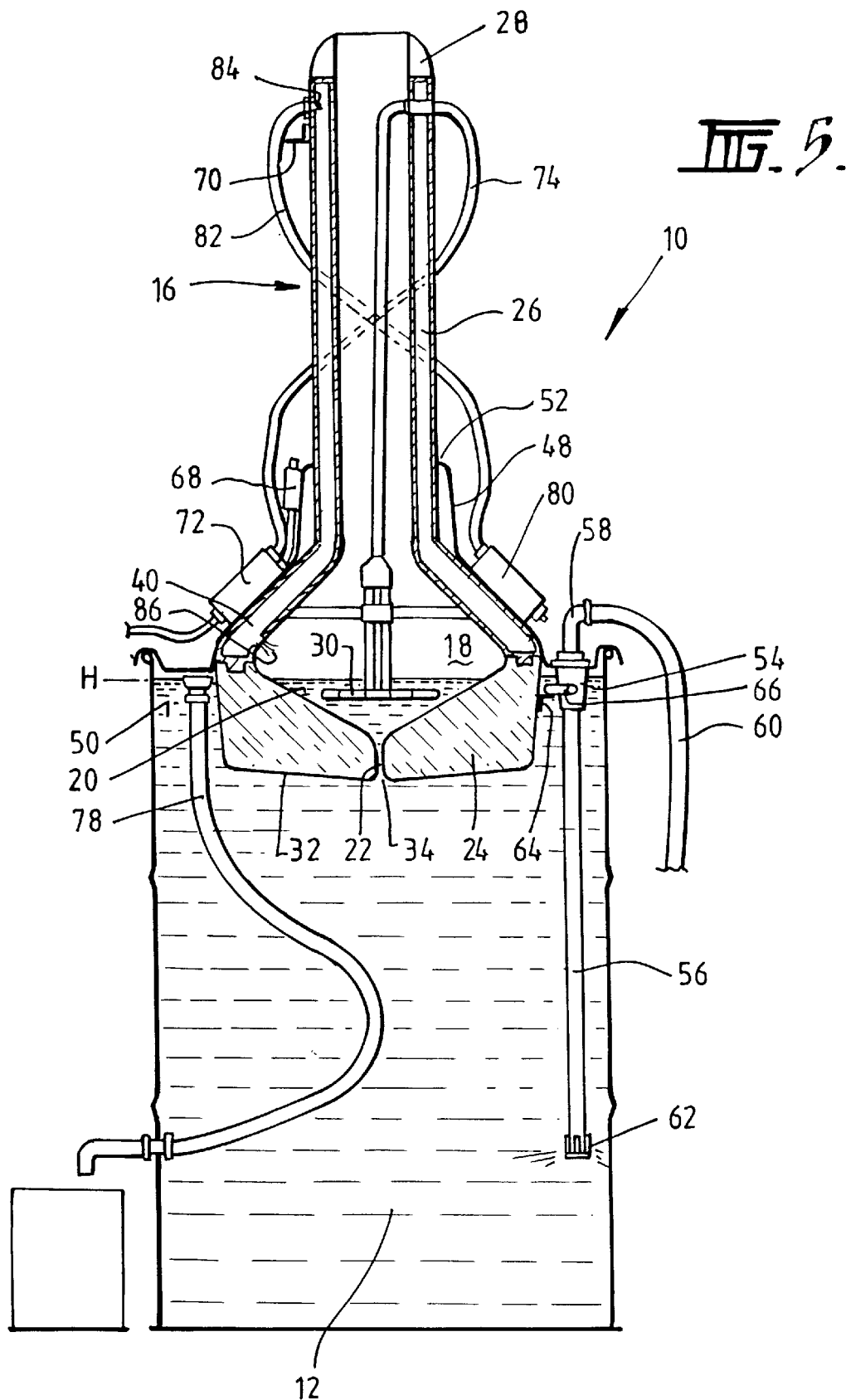

A second embodiment of the apparatus is shown in FIG. 5 in which like reference numbers are used to denote the same feature as in the first embodiment depicted in FIG. 1–4. The second embodiment is the same as the first with the exception of the following differences. The float assembly 16 and the stack 26 in the second embodiment are hollow and air filled. The air provides both thermal insulation and buoyancy. Also the stack 26 of the second embodiment replaces the combination of the stack 26 and shell 40 of first embodiment thereby eliminating the split line 42 of the first embodiment. Additionally the second embodiment includes an ozone generator 80 mounted on the outside of lid 48 for purifying the steam/vapour prior to discharge from the stack 26. A hose 82 extends from ozone generator 80 to a fee hole 84 near the top of stack of 26. This channels ozone into the hollow stack 26. A discharge hole 86 is formed in the stack 26 near the bottom of the stack 26 to direct ozone into the space 18 at a level above the water 20. Of course more than one discharge hole 86 can be provided.

A typical application for the apparatus 10 will now be described.

In say an automotive workshop it is common to have a parts washing machine for washing engine parts such as an engine block. Many parts washing machines now rely on the use of water and detergents for cleaning purposes. The water may be recycled several times by the machine and then dumped to a storage tank for collection by a waste disposal service. Once collected, the waste may be disposed of in various ways. In is envisaged that the present apparatus may be used with the storage tank into which the waste water is dumped. Typically the tank is in the form of a 44 gallon drum (although it might take other forms). The apparatus 10 including lid 48 would be placed over and in the storage tank and hose 60 connected with an outlet hose from the parts washing machine. The position of the stop 70 can be adjusted to ensure that a substantial period of time is required for the level of sludge 76 in the to increase to a level where it requires removal. When the tank is empty as shown in FIG. 1, the stop 70 operates switch 68 to cut off power to the heater 30 and therefor no evaporation is taking place. When water is pumped from a parts washing machine it passes through hose 60, valve 54 and pipe 56 into the tank. When the water level exceeds level L (shown in FIG. 3) the float assembly 16 floats upwardly removing the stop 70 from the switch 68 thereby turning on power to the heater 30. Water within the tank enters the space 18 through hole 22. It will be appreciated that the level of water within the space 18 is substantially the same as that of the drum or tank within which the apparatus 10 is held. With a volume of water 20 now in the space 18 the heater 30 acts on the water causing it to evaporate. The evaporated water, ie steam and other vapours pass through the stack 26 and arc vented through the discharge end 28 outside of the storage tank. The evaporation process continues until again the level of water within the tank drops to below level L. If the water level builds up to a maximum level II the stop 64 operates the lever 66 on valve 54 to prevent further water entering the tank and thus avoid overflow.

In many cases, the water to be evaporated will contain suspended particles. These particles may enter the space 18 with the volume of water 20. If these particles settle from the volume of water 20 they will fall onto the sloping surface 38 and roll, slide or otherwise gravitate downwardly toward the hole 22. The slope of the surface 38 and the diameter of the hole 22 are formed so that the flow rate of water into the space 18 does not inhibit the counter flow of settled suspended products down through the hole 22 back into the tank proper.

After an extended period of time the sludge 76 built up in the tank will need to be removed by conventional methods. However it is envisaged that this may not be required for many months or years. In addition, if numerous apparatuses 10 are operating at the same time and same location then the sludge built up in multiple tanks can then be dumped into a single dedicated storage tank so that the services of a waste disposal company are required at only very long intervals.

From the above description it will be apparent that embodiments of the present invention enjoy numerous advantages and benefits over the prior art. In particular, because the assembly 16 is insulated and only operates on a small volume of water at a time it is highly efficient. Energy is not wasted in attempting to heat the whole volume of water at one time together with the vessel or container in which the water is contained. Further, steam or vapour generated by the apparatus 10 is vented to a location outside of the tank to prevent the build up of condensate on the inside of the tank and also reduce the likelihood of corrosive gases or vapours attacking the tank. Also, the apparatus 10 is fully demountable and can be easily moved from tank to tank and operate on tanks of different size. Indeed the larger the diameter of tank in which the apparatus operates the greater the volume of water than can be evaporated for a given vertical displacement of the float assembly 16. Additionally, because the water entering the space 18 which is evaporated comes from below the surface level of the water within the tank it is largely free of floating oils or other organic compounds. Therefore the vapour and steam generated is "cleaner" than that obtained by evaporating the bulk of the water within the tank.

Now that an embodiment of the invention has been described in detail it will also be apparent to those of ordinary skill in the art that numerous modifications and variations may be made without departing from the basic inventive concepts. For example, the float assembly 16, stack 26 and/or shell may be made from any suitable insulating material or structure. Also, while the embodiment has been described in relation to the operation of waste water it can be used for evaporating other types of waters or liquids such as in a humidifier. Further, although only one hole 22 has been shown providing communication between the inside and outside of the space 18 holes can be used. Additionally it is believed that the best heater 30 for this application is an electric immersion heater. Although it may be possible to use different types of heaters or heat sources. The specific nature of the heater is not critical to the invention in its broadest form. However clearly the choice of heater will affect operating efficiency of embodiments of the invention. All such modifications and variations together with others which would be obvious to a person of ordinary skill in the art are deemed to be within the scope of the present invention the nature of which is to be determined from the aforegoing description and the appended claims.

I claim:

1. A water evaporation apparatus for evaporating water contained in a receptacle including:

a thermally insulated assembly for floating in water contained within the receptacle, the float assembly defining a space and having a hole extending from the space to a bottom wall of the float to provide fluid communication between the receptacle and the space so that, in use, a volume of the water flows into the space, the space being formed with a lower surface which slopes downwardly to the hole for directing sediment or precipitate that settles from the volume of water to flow down the lower surface and through the hole to sink to the bottom of the receptacle, the float assembly also having an exhaust stack which extends from the space to a location outside the receptacle; and a heater supported by the float assembly for heating the volume of water held within the space to cause evaporation thereof so that as the volume of water in the space is evaporated, the evaporated water is vented through the exhaust stack to a location outside of the receptacle and replaced by water from the receptacle which flows into the space thereby progressively evaporating the water from the receptacle.

2. A water evaporation apparatus according to claim 1 wherein the hole is of a diameter that limits the flow rate of water into the space so as to not prohibit the counter flow of sediment or precipitate from the space through the hole into the receptacle.

3. A water evaporation apparatus according to claim 2 wherein the lower surface is in the shape of a cone with an internal apex angle in the order of 100–140°.

4. A water evaporation apparatus according to claim 3 wherein the internal apex angle of the bottom surface is about 1200°.

5. A water evaporation apparatus according to claim 2 wherein the hole is of a diameter in the range of 5–10 millimeters.

6. A water evaporation apparatus according to claim 5 wherein the hole is of a diameter of about 7.5 millimeters.

7. A water evaporation apparatus according to claim 1 wherein a bottom surface of the bottom wall tapers downwardly in the radial direction from the outer periphery of the bottom wall to a central point coincident with the lower opening of the hole.

8. A water evaporation apparatus according to claim 1 further including a lid that is dimensioned to cover an open end of the receptacle and is provided with an aperture through which the exhaust stack passes and, in use, slides, so that as water is evaporated from or added to the receptacle the exhaust stack slides down or up, respectively, through the lid commensurate with the change in level of the water.

9. A water evaporation apparatus according to claim 8 further including a switch for controlling the delivery of power to the heater, the switch being automatically operated to cut off power to the heater when the water level drops to a first predetermined level.

10. A water evaporation apparatus according to claim 9 wherein the switch is mounted on the lid and is tripped by a stop formed on or coupled to the exhaust stack.

11. A water evaporation apparatus according to claim 10 wherein the location of the stop along the exhaust stack can be adjusted to thereby provide adjustment of the first predetermined level.

12. A water evaporation apparatus according to claim 1 wherein the stack and the float are formed as separate components that are detachably coupled so that the components can be separated for servicing of the heater and space.

13. A water evaporation apparatus according to claim 10 wherein one of the float assembly and exhaust stack is provided with a second stop for activating a valve that controls flow of water into the receptacle, the second stop operating the valve when the float assembly is at a predetermined level, thereby prohibiting further flow of water into the receptacle.

14. A water evaporation apparatus according to claim 1 further including an ozone generating device for generating ozone and delivering said ozone to the space above the volume of water for purifying air vapor and evaporated water discharged from the exhaust stack.

15. A water evaporation apparatus according to claim 14 wherein the ozone generator includes an integrated fan for blowing ozone into the space and blowing steam and water vapor up and out of the stack.

16. A water evaporation apparatus according to claim 1 further including an exhaust fan mounted along the exhaust stack to draw evaporated water and air from the exhaust stack.

17. A water evaporation apparatus according to claim 16 wherein the float assembly or exhaust stack is provided with at least one breath hole at a level above the surface level of the water in the receptacle to allow air to be drawn into the float assembly.

18. A water evaporation apparatus according to claim 1 further including a fan which blows air into the space at a level near and above the surface of the volume of water to assist in blowing the steam and water vapor up and out of the stack.

19. A water evaporation apparatus for evaporating water contained in a receptacle including:

a thermally insulated float assembly for floating in water contained within the receptacle, the float assembly defining a space in fluid communication with the water in the receptacle so that, in use, a volume of that water flows into the space, the float assembly also having an exhaust stack which extends from the space to a location outside the receptacle;

a heater supported by the float assembly for heating the volume of water held within the space to cause evaporation thereof so that as the volume of water in the space is evaporated, the evaporated water is vented through the exhaust stack to a location outside the receptacle and is replaced by water from the receptacle that flows into the space thereby progressively evaporating the water from the receptacle;

a lid that is dimensioned to cover an open end of the receptacle and provided with an aperture through which the exhaust stack passes and, in use, slides, so that as water is evaporated from or added to the receptacle, the exhaust stack slides up or down through the aperture;

a switch mounted on the lid for controlling the delivery of power to the heater; and, a stop formed on or coupled to the exhaust stack for automatically operating the switch to cut off delivery of power to the heater when the water level drops to a first predetermined level.

20. A water evaporation apparatus for evaporating water contained within a receptacle including:

a thermally insulated float assembly for floating in water contained within the receptacle, the float assembly defining a space in fluid communication with the water in the receptacle so that, in use, a volume of that water flows into the space, the float assembly also having an exhaust stack that extends from the space to a location outside the receptacle;

a heater supported by the float assembly for heating the volume of water held within the space to cause evaporation thereof so that as the volume of water in the space is evaporated, the evaporated water is vented through the exhaust stack to a location outside the receptacle and is replaced by water from the receptacle which flows into the space thereby progressively evaporating water from the receptacle; and a stop provided on one of the float assembly and exhaust stack for activating a valve for controlling the flow of water into the receptacle, the stop activating the valve when the float assembly is at a predetermined upper level, thereby prohibiting further flow of water into the receptacle.

* * * * *